United States Patent
Finocchiaro et al.

(10) Patent No.: US 10,044,290 B2
(45) Date of Patent: Aug. 7, 2018

(54) ENERGY HARVESTER, CORRESPONDING APPARATUS AND METHOD

(71) Applicant: STMicroelectronics S.r.l., Agrate Brianza (IT)

(72) Inventors: Alessandro Finocchiaro, Catania (IT); Giuseppe Palmisano, S. Giovanni la Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 130 days.

(21) Appl. No.: 15/160,674

(22) Filed: May 20, 2016

(65) Prior Publication Data

US 2017/0133945 A1 May 11, 2017

(30) Foreign Application Priority Data

Nov. 10, 2015 (IT) .................. 102015000071103

(51) Int. Cl.
| | |
|---|---|
| H01F 27/42 | (2006.01) |
| H02M 7/25 | (2006.01) |
| H02M 3/07 | (2006.01) |
| H02M 7/217 | (2006.01) |

(52) U.S. Cl.
CPC ............. *H02M 7/25* (2013.01); *H02M 3/07* (2013.01); *H02M 7/217* (2013.01)

(58) Field of Classification Search
CPC ........... H02M 7/25; H02M 3/07; H02M 7/217
See application file for complete search history.

(56) References Cited

U.S. PATENT DOCUMENTS

| | | | | |
|---|---|---|---|---|
| 4,214,174 | A | 7/1980 | Dickson | |
| 6,037,622 | A | 3/2000 | Lin et al. | |
| 6,774,707 | B1* | 8/2004 | Smith | H02M 3/073 |
| | | | | 327/536 |
| 6,878,981 | B2* | 4/2005 | Eshel | G11C 5/145 |
| | | | | 257/299 |
| 9,768,711 | B2* | 9/2017 | Hameed | H02M 7/25 |

FOREIGN PATENT DOCUMENTS

CN 104113224 A 10/2014

OTHER PUBLICATIONS

Dickson, J. F.: "On-Chip High-Voltage Generation in MNOS Integrated Circuits Using an Improved Voltage Multiplier Technique," IEEE J. Solid-State Circuits, vol. SSC 11, No. 3, pp. 374-378, Jun. 1976.

(Continued)

*Primary Examiner* — Jared Fureman
*Assistant Examiner* — Duc M Pham
(74) *Attorney, Agent, or Firm* — Crowe & Dunlevy

(57) ABSTRACT

An energy harvester circuit operates to harvest energy in battery-less electrical apparatus. The circuit includes a string of capacitors coupled to a circuit input to receive energy to be harvested. A string of transistors are coupled as pumping transistors to respective ones of the capacitors in the string of capacitors. A compensation coupling circuit is coupled between each transistor in the string of pumping transistors and one of a subsequent or a preceding transistor in the string of pumping transistors.

34 Claims, 4 Drawing Sheets

(56) References Cited

OTHER PUBLICATIONS

Papotto, G., et al: "A 90-nm CMOS Threshold-Compensated RF Energy Harvester," IEEE J. Solid-State Circuits, vol. 46, pp. 1985-1997, Sep. 2011.
Italian Search Report and Written Opinion for IT 102015000071103 dated Jul. 27, 2016 (9 pages).
Yuan J S et al: "Process and Temperature Robust Voltage Multiplier Design for RF Energy Harvesting," Microelectronics and Reliability, Elsevier Science Ltd, GB, vol. 55, No. 1, Oct. 16, 2014, pp. 107-113, XP029122545.
Hameed Zohaib et al: "A 3.2 V—15 dBm Adaptive Threshold-Voltage Compensated RF Energy Harvester in 130 nm," IEEE Transactions on Circuits and Systems I: Regular Papers, IEEE. US, vol. 62, No. 4, Apr. 1, 2015, pp. 948-956, XP011577084.
Papotto Giuseppe et al: "A 90-nm CMOS 5-Mbps Crystal-Less RF-Powered Transceiver for Wireless Sensor Network Nodes," IEEE Journal of Solid-State Circuits, IEEE Service Center, Piscataway, NM, JS, vol. 49, No. 2, Feb. 1, 2014, pp. 335-346, XP011538061.

\* cited by examiner

ENERGY HARVESTER, CORRESPONDING APPARATUS AND METHOD

PRIORITY CLAIM

This application claims priority from Italian Application for Patent No. 102015000071103 filed Nov. 10, 2015, the disclosure of which is incorporated by reference.

TECHNICAL FIELD

The description relates to energy harvesters.

One or more embodiments may find use in a variety of applications such as e.g. battery-less systems such as wireless sensor networks (WSNs)

BACKGROUND

In energy harvesting (or, according to other designations, power harvesting or energy scavenging), energy from sources such as e.g. solar panels, wind generators, thermal generators of various types is stored for possible use in devices such as wireless portable devices or wireless sensors (e.g. in wireless sensor network—WSN—applications).

Nowadays, more and more emerging applications may be facilitated by the availability of battery-less systems based on different harvesting approaches (i.e., photo-voltaic, piezo, radio-frequency, etc.), with the purpose of implementing low-cost systems with highly integrated wireless platforms. Furthermore, battery-less systems may facilitate developments in all those scenarios where periodical node battery replacement may be impractical e.g. because of either a large number of nodes or inaccessible node placement (e.g., implanted medical devices, smart concrete systems, or in general devices located in hazardous environments). A growing demand thus exists for improved energy harvesting devices (energy harvesters).

SUMMARY

According to one or more embodiments, an energy harvester is presented.

One or more embodiments may also relate to corresponding apparatus (e.g. battery-less apparatus) as well as to a corresponding method.

In one or more embodiments may offer one or more of the following advantages: improved threshold self-compensation for large number of stages (i.e., with low amplitudes of the RF signal) or for small number of stages (i.e., relative high amplitude of the RF signal); level of voltage threshold compensation accurately set; increase in power conversion efficiency; improved sensitivity; and possibility of implementation by e.g. standard CMOS technology.

In an embodiment, an energy harvester circuit comprises: a string of capacitors coupled to a circuit input to receive energy to be harvested, a string of transistors coupled as pumping transistors to respective ones of the capacitors in said string of capacitors, and a compensation coupling circuit coupled between each transistor in said string of transistors and one of a subsequent or a preceding transistor to said each transistor in said string of transistors.

In an embodiment, an energy harvester circuit comprises: a first input; a second input; a first pumping transistor having a source-drain path coupled between a first node and a second node; a first capacitor coupled between the second node the first input; a second pumping transistor having a source-drain path coupled between the second node and a third node; a second capacitor coupled between the third node and the second input; a first compensation capacitor coupled between the first node and a control terminal of the first pumping transistor; a second compensation capacitor coupled between the control terminal of the first pumping transistor and the third node; a third compensation capacitor coupled between the second node and a control terminal of the second pumping transistor.

BRIEF DESCRIPTION OF THE DRAWINGS

One or more embodiments will now be described, by way of example only, with reference to the annexed figures, wherein.

DETAILED DESCRIPTION

Figure 1:
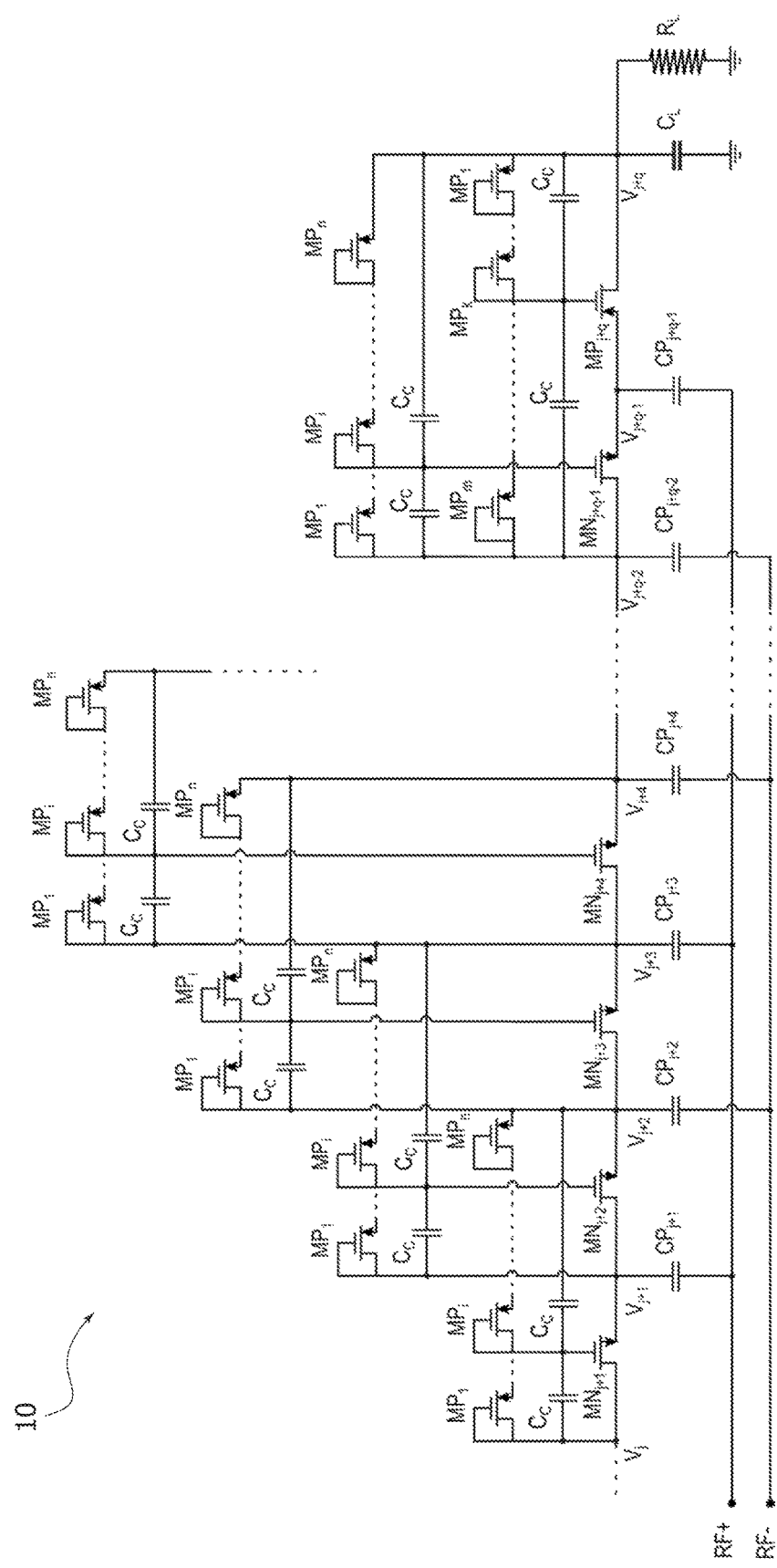
FIG. 1 is a circuit diagram of an energy harvester.

In the ensuing description, one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may exploit electromagnetic waves as a power source. For instance, one or more embodiments may provide a RF energy harvester circuit. A RF harvester as exemplified herein may rely on power extracted from radio waves as transmitted by a hub or base-station. An energy harvester as exemplified herein may thus act as RF-DC converter.

Using RF energy harvesters may be facilitated by the capability of working with (very) low power levels so as to obtain a high operating distance (r) from the power emitting source. Propagation of RF energy may be modeled e.g. by means of the Friis equation, which results in power in free space decreasing as $r^2$, $$P_R = P_T G_T G_R (\lambda/4\pi r)^2$$

where $P_R$ is the power available at the input of the receiving antenna, $P_T$ is the output power of the transmitting antenna, $G_T$ and $G_R$ are the transmitting and receiving antenna gains, respectively, and $\lambda$ is the wavelength.

The lowest RF input power permitting the circuit to convert RF energy into DC is called sensitivity.

Another performance parameter is the power conversion efficiency (PCE), which is a measure of how efficiently the RF input power Pin is transformed into DC output power Pout, that is:

$$PCE = P_{out}/P_{in}.$$

Designing energy harvesters may thus involve:
improving sensitivity with the aim of increasing the operating distance;
increasing PCE so that e.g. the output power $P_{out}$ for a same input power $P_{in}$ may be increased.

Reducing such input power $P_{in}$ and hence improving sensitivity may involve decreasing the corresponding voltage amplitude, $V_{in}$, of the RF input signal or, conversely, increasing the equivalent input resistance $R_{in}$ of the circuit $$P_{in} = 1/2(V_{in}^2/R_{in}).$$

In both cases, various issues may arise.

For instance, an increase in $R_{in}$ (e.g. a high-Q equivalent input impedance) may affect the matching with the antenna due to the reduced bandwidth and the sensitivity of the reflection coefficient of the S-parameters, e.g. $S_{11}$ to process variations. In fact, the frequency shift outside the useful band of the peak of $S_{11}$ involves a high power mismatch at the operating frequency.

On the other hand, reducing $V_{in}$ may render power conversion inefficient since many stages in cascade may be involved in achieving a desired DC voltage.

A circuit for RF energy harvester may include a multi-stage rectifier based on the so-called Dickson's topology: see e.g. J. F. Dickson, "On-chip high-voltage generation in MNOS integrated circuits using an improved voltage multiplier technique," IEEE J. Solid-State Circuits, vol. SSC 11, no. 3, pp. 374-378, June 1976 (incorporated by reference).

A NMOS version (e.g. using N-channel transistors) of that circuit may be implemented in CMOS technology with diode-connected transistors as pumping/rectifying devices are used.

However, performance of a Dickson multi-stage rectifier may be affected by the threshold voltage of MOS transistors, which reduces the PCE and sets the input voltage to turn the circuit on.

Indeed, as shown in the above-captioned Dickson article and in G. Papotto, F. Carrara, G. Palmisano: "A 90-nm CMOS threshold-compensated RF energy harvester," IEEE J. Solid-State Circuits, vol. 46, pp. 1985-1997, September 2011 (incorporated by reference), the dc output voltage of a Dickson rectifier with M+1 pumping devices can be expressed as:

$$V_O = M\left(\frac{C}{C+C_P}V_A - \frac{I_o}{(C+C_P)f} - V_{th}\right) - V_{th}$$

where $V_A$ is the amplitude of the ac input signal, C is the coupling capacitor, $C_P$ is the parasitic capacitance at each pumping node, $I_O$ is the average output current, f is the operating frequency, and $V_{th}$ is the threshold voltage of the MOS transistors.

Various solutions exploiting a fully passive threshold compensation may overcome the threshold voltage limitation. For instance the article by G. Papotto, et al. mentioned in the foregoing applies an ideal concept of threshold voltage compensation in a Dickson multi-stage rectifier is by using a compensation voltage between the gate and drain terminals of the pumping transistors.

A possible implementation of such a concept may involve a threshold self-compensation as disclosed e.g. in U.S. Pat. No. 4,214,174 A (incorporated by reference), with a compensation voltage is set to the source terminal of two adjacent transistors.

A drawback of such a solution may lie in that, due to the limited value of compensation voltage available, the compensation level may not be effective for a high number of stages and/or for low RF amplitudes. On the other hand the compensation voltage may turn out to be way too high for a small number of stages and/or for high RF amplitudes.

The article by G. Papotto, et al. mentioned in the foregoing exemplifies generalization of the concept underlying U.S. Pat. No. 4,214,174 A, with a compensation voltage set to the source of 2N adjacent transistors. In that case, while adapted to be optimized for a high number of stages, the compensation level may again be excessive for small number of stages and/or high RF amplitudes.

Finally, U.S. Pat. No. 6,037,622 A discloses self-compensation performed through a second charge pump circuit, at expense of an increase in silicon area and power consumption, with a consequent loss in power efficiency.

One or more embodiments as exemplified herein may combine the advantages of the $2N^{th}$ order threshold self-compensation described in the documents cited in the foregoing and may be applied efficiently regardless the number of stage and/or the level of ac input voltage.

Throughout the figures, RF+ and RF− denote two input lines to an energy harvester 10 adapted to receive an input voltage $V_{in}(t)$ from an energy source—not visible in the figures. Such an energy source may be e.g. any of the energy sources mentioned in the introductory portion to this description.

The input voltage $V_{in}(t)$ may be expressed as:

$$V_{in}(t) = V_A \sin(\omega t)$$

where $V_A$ is the amplitude of the ac input signal, ω is the angular frequency given by ω=2πf and f is the operating frequency.

In one or more embodiments, the input voltage $V_{in}(t)$ may be differentially applied between RF+ and RF−.

In one or more embodiments, the input voltage can be applied to one of the two input lines (e.g. RF+) by grounding the other line (e.g. RF−).

Figure 2:
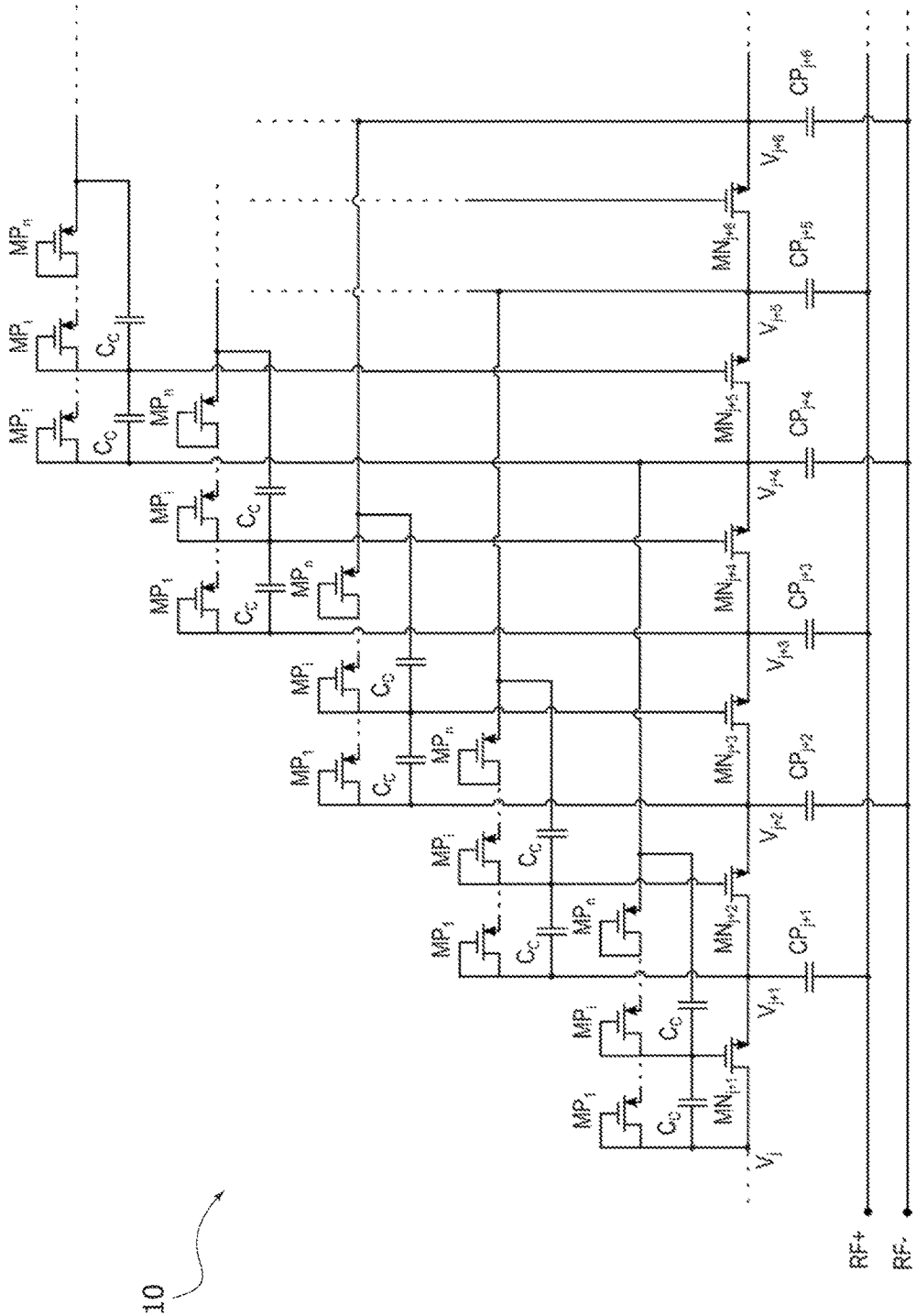
FIG. 2 is a circuit diagram of an energy harvester.

In one or more embodiments, a portion of an energy harvester may include a string of capacitors e.g. . . . , $CP_{j+1}$, $CP_{j+2}$, $CP_{j+3}$, $CP_{j+4}$, . . . (e.g. in the diagrams of FIGS. 1 and 3) and . . . , $CP_{j+1}$, $CP_{j+2}$, $CP_{j+3}$, $CP_{j+4}$, $CP_{j+5}$, $CP_{j+6}$, . . . (in the diagram of FIG. 2) having:

first terminals connected in an alternate sequence to the lines RF+ and RF− (e.g. $CP_{j+1}$ to RF+, $CP_{j+2}$ to RF−, $CP_{j+3}$ to RF+, $CP_{j+4}$ to RF− and, possibly $CP_{j+5}$ to RF+ and $CP_{j+6}$ to RF−), and second terminals connected to points $V_{j+1}$, $V_{j+2}$, $V_{j+3}$, $V_{j-4}$ (and $V_{j+5}$, $V_{j+6}$, in FIG. 2) coupled to pumping transistors $MN_{j+1}$, $MN_{j+2}$, $MN_{j+3}$, $MN_{j+4}$, (and $MN_{j+5}$, $MN_{j+6}$, in FIG. 2).

In one or more embodiments, the transistors may be e.g. field effect transistors such as MOSFETS having their current generating terminals (that is, their sources in the case of MOSFETs) coupled to the points $V_{j+1}$, $V_{j+2}$, $V_{j+3}$, $V_{j+4}$ (and $V_{j+5}$, $V_{j+6}$, in FIG. 2).

In one or more embodiments, a pair of capacitors $C_c$ may be coupled to each transistor $MN_{j+1}$, $MN_{j+2}$, $MN_{j+3}$, $MN_{j+4}$, (and $MN_{j+5}$, $MN_{j+6}$, in FIG. 2) e.g. in an arrangement wherein:

a first capacitor $C_c$ is set between the current sink terminal and the control terminal (that is, between drain and gate in the case of MOSFETs) of each transistor, and a second capacitor $C_c$ is set between the control terminal (that is, the gate in the case of MOSFETs) of each transistor and the current generating terminal (that is, the source in the case of MOSFETs) of e.g. a subsequent transistor in the string.

In one or more embodiments, the (capacitive) compensation coupling here exemplified by the series connection of the two capacitors $C_c$ is thus set between the current sink terminal (drain) of each (pumping) transistor and the current generating terminal (source) of another (e.g. subsequent) transistor in the string.

Such a representation is merely exemplary and not limitative of the embodiments: in one or more embodiments a single capacitor $C_c$ may be set between the current sink terminal (drain) and the control terminal (gate) of each (pumping) transistor or between the control terminal (gate) and the current generating terminal (source) of another (e.g. subsequent) transistor in the string.

Moreover, in one or more embodiments, the current sink terminal (drain) of the first (pumping) transistor (see FIGS. 1-3 with j=0) may be connected to ground (gnd).

Figure 3:
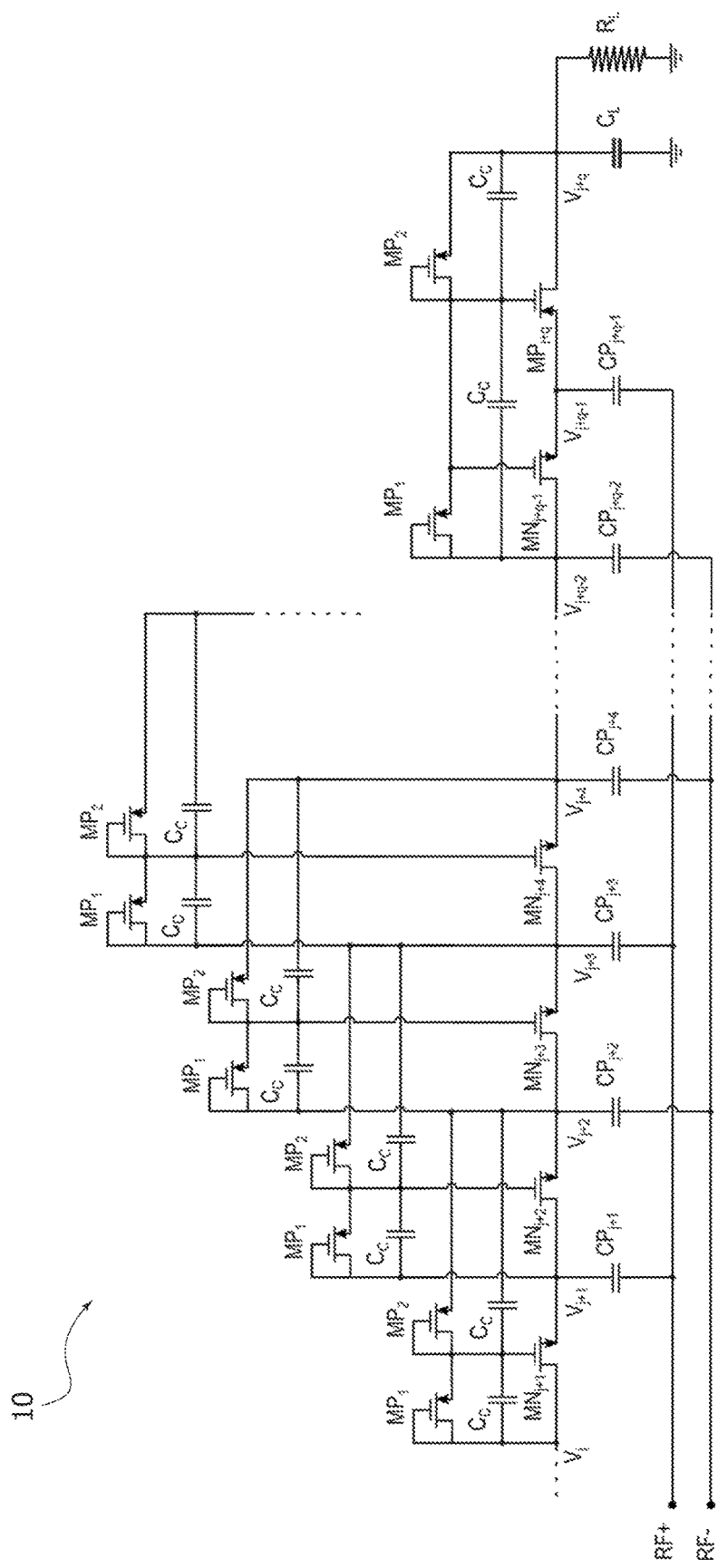
FIG. 3 is a circuit diagram of an energy harvester.

While e.g. FIGS. 1 and 3 show just a small number of capacitors e.g. $CP_{j+1}$, $CP_{j+2}$, $CP_{j+3}$, $CP_{j+4}$, . . . , $CP_{j+q-2}$, $CP_{j-q-1}$, and transistors e.g. $MN_{j+1}$, $MN_{j+2}$, $MN_{j-3}$, $MN_{j-4}$, . . . , $MN_{j+q-1}$, $MN_{j+q}$, one or more embodiments of energy harvesters 10 as exemplified herein may include a (much) higher number of capacitors/transistors mutually coupled as exemplified herein.

In one or more embodiments, a level or range of compensation voltage, Vc for the threshold compensation may be selected by connecting the capacitors $C_C$ within a range of possible values set between a lower or lowest value and a higher or highest value for the harvester circuit 10.

For instance, the diagrams of FIGS. 1 and 3 are exemplary of $2^{nd}$ order compensation, with the range set between the current sink terminal (drain) and the current generating terminal (source) of two adjacent transistors (e.g. $MN_{j+1}$ and $MN_{j+2}$, $MN_{j-2}$ and $MN_{j+3}$, and so on).

The diagram of FIG. 2 exemplary of $4^{th}$ order compensation, with the range set between the current sink terminal (drain) and the current generating terminal (source) of four adjacent transistors (e.g. $MN_{j+1}$ and $MN_{j+4}$, $MN_{j+2}$ and $MN_{j+5}$, and so on).

Figure 4:
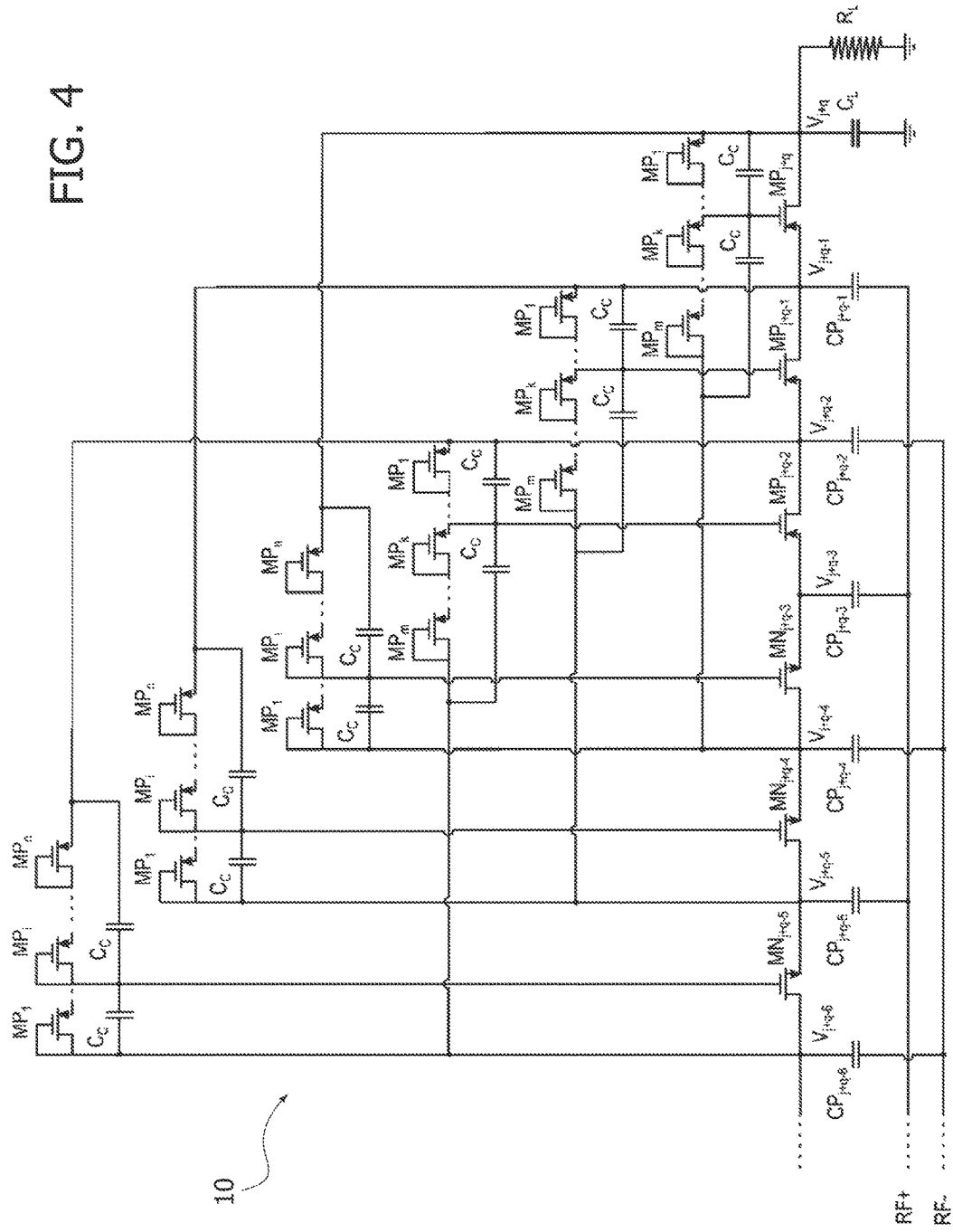
FIG. 4 is a circuit diagram of an energy harvester.

Moreover, the diagram of FIG. 4 is also exemplary of $4^{th}$ order compensation, with the range set between the current sink terminal (drain) and the current sink terminal (drain) of four adjacent transistors (e.g. $MN_{j+q-5}$ and $MP_{j+q-2}$, $MN_{j+q-4}$ and $MP_{j+q-1}$, $MN_{j+q-3}$ and $MP_{j+q}$).

For instance, in the case of e.g. $6^{th}$ order compensation the range may be set between e.g. the current sink terminal (drain) and the current generating terminal (source) of six adjacent transistors, etc.

Those transistors located at the end of the circuit array, for which such a range coverage towards—subsequent—transistors may not be feasible (e.g. the transistor $MN_{j+4}$ in FIGS. 1 and 3, or the transistors $MN_{j-4}$, $MN_{j+5}$, $MN_{j+6}$ in FIG. 2 in the case no subsequent transistors are present) may be configured e.g. as cascading P-channel transistors as exemplified in the FIGS. 1, 3 and 4, with these PMOS transistors compensated considering the nodes "downwards" in the chain, that is preceding transistors in the chain.

For instance, in one or more embodiments, a pair of capacitors $C_c$ may be coupled to the pumping transistors $MN_{j+q-1}$, $MP_{j+q}$, in FIGS. 1 and 3, or $MN_{j+q-5}$, $MN_{j+q-4}$, $MN_{j+q-3}$, $MP_{j+q-2}$, $MP_{j+q-1}$, $MP_{j+q}$, in FIG. 4 e.g. in an arrangement wherein:

a first capacitor $C_c$ is set between the current sink terminal and the control terminal (that is, between drain and gate in the case of MOSFETs) of each transistor, and a second capacitor $C_c$ is set between the control terminal (that is, the gate in the case of MOSFETs) of each transistor and the current sink terminal (that is, the drain in the case of MOSFETs) of a subsequent—or preceding—transistor in the string.

In one or more embodiments, diode-connected transistors may be inserted at the end of the chain to compensate $MN_{j+4}$ for FIGS. 1 and 3 or $MN_{j+4}$, $MN_{j+5}$, $MN_{j+6}$ for FIG. 2.

In one or more embodiments, an energy harvester circuit 10 as exemplified herein may be terminated on a load capacitor $C_L$ which acts as an energy storage, with a load resistance $R_L$ being representative of the current consumption of the apparatus.

In one or more embodiments the load capacitor $C_L$ and the load resistance $R_L$ may be regarded as connected between the current sink terminal (drain in the case of MOSFETs) of last transistor $MP_{j+q}$ (i.e. $V_{j+q}$) and ground (gnd).

In one or more embodiments, in order to select Vc to achieve a desired compensation voltage resolution, a string formed by diode-connected transistors $MP_1$, $MP_i$, . . . $MP_n$ may be arranged between the current sink terminal (drain) of the pumping transistor and the current generating terminal (source) of a subsequent transistor in the string.

Also, in one or more embodiments, in order to select Vc to achieve a desired compensation voltage resolution of the last NMOS and PMOS transistors (e.g. $MN_{j+q-1}$, $MP_{j+q}$ in FIGS. 1 and 3, or $MN_{j+q-5}$, $MN_{j+q-4}$, $MN_{j+q-3}$, $MP_{j+q-2}$, $MP_{j+q-1}$, $MP_{j+q}$ in FIG. 4), strings formed by diode-connected transistors $MP_1$, $MP_i$, . . . $MP_n$ and $MP_1$, $MP_k$, . . . $MP_m$ may be arranged between the current sink terminal (drain) of the pumping transistor and the current sink terminal (drain) of a subsequent or preceding transistor in the string.

In one or more embodiments, the last NMOS transistors e.g. $MN_{j+q-1}$ for FIGS. 1 and 3, or $MN_{j+q-5}$, $MN_{j+q-4}$, $MN_{j+q-3}$, for FIG. 4, and the last PMOS transistors e.g. $MP_{j+q}$ for FIG. 1, or $MP_{j+q-2}$, $MP_{j+q}$, for FIG. 4, may share the same string $MP_1$, $MP_k$, . . . $MP_m$.

FIG. 3 is exemplary of a simple embodiment of a $2^{nd}$ order compensation topology with a string made up of two diode-connected MOS transistors $MP_1$ and $MP_2$. In this embodiment, the last NMOS and PMOS transistors of the chain share the string with two transistors saved.

In one or more embodiments, the transistors in the string $MP_1$, $MP_i$, . . . $MP_n$ may be arranged according e.g. to a pattern as exemplified for the capacitors $C_C$.

In one or more embodiments, the control terminal (gate) of the pumping transistor may be connected to an "optimum" voltage value in the string.

In one or more embodiments, diode-connected NMOS or PMOS transistors may be used to implement the strings $MP_1$, $MP_i$, . . . $MP_n$ and $MP_1$, $MP_k$, . . . $MP_m$, with PMOS transistors allowing the silicon area occupation to be reduced.

In one or more embodiments, the transistors in the string may be sized to have a negligible current consumption and hence not to affect PCE of the overall circuit.

In one or more embodiments, the transistors in the string may be implemented with triode-biased MOS transistors.

In one or more embodiments, the transistors in the strings $MP_1$, $MP_i$, ... $MP_n$, and $MP_1$, $MP_k$, ... $MP_m$, may be replaced with high resistivity integrated resistors (e.g. high poly resistors).

To add the signal component $V_{in}(t)$ at the compensation voltage $V_C$, coupling capacitors Cc may be adopted which may sized so as to have a reactance negligible at the operating frequency, so that they operate essentially as short-circuits. The voltage at the control terminal (gate) of the pumping transistors may be expressed as:

$$V_{in}(t)+V_C=V_A \sin(\omega t)+V_C.$$

For instance, in the case of $2^{nd}$ order compensation and by reference to the symbols in the figures, the voltage Vc may be expressed as:

$$V_c = (V_{j+2} - V_j)\frac{i}{n} \quad i = 1, 2, \ldots, n-1$$

Therefore, in one or more embodiments a corrective factor i/n may be achieved in Vc, which allows achieving an adequate value of voltage compensation.

For a $4^{th}$ order multi-stage rectifier (FIG. 2) and by reference to the symbols in the figures, the voltage Vc may be expressed as:

$$V_c = (V_{j+4} - V_j)\frac{i}{n} \quad i = 1, 2, \ldots, n-1$$

Also in this case, a corrective factor i/n may be achieved in Vc, which allows an adequate value of voltage compensation.

In one or more embodiments, the approach exemplified herein may be extended, in general, to 2N order compensation topologies.

One or more embodiments may thus provide an energy harvester circuit 10 including:
- a string of capacitors (e.g. $CP_{j-1}$, $CP_{j+2}$, $CP_{j+3}$, $CP_{j+4}$, ..., $CP_{j+q-2}$, $CP_{j+q-1}$ in FIGS. 1 and 3 and $CP_{j+1}$, $CP_{j+2}$, $CP_{j+3}$, $CP_{j+4}$, $CP_{j+5}$, $CP_{j+6}$, ..., $CP_{j+q-6}$, $CP_{j+q-5}$, $CP_{j+q-4}$, $CP_{j+q-3}$, $CP_{j+q-2}$, $CP_{j+q-1}$ in FIGS. 2 and 4) coupled to a circuit input RF+, RF− to receive energy (e.g. RF energy) to be harvested,
- a string of transistors (e.g. $MN_{j+1}$, $MN_{j+2}$, $MN_{j+3}$, $MN_{j+4}$, ..., $MN_{j+q-1}$, $MP_{j+q}$ in FIGS. 1 and 3 and $MN_{j+1}$, $MN_{j+2}$, $MN_{j+3}$, $MN_{j+4}$, $M_{j+5}$, $M_{j-6}$, ..., $MN_{j-q-5}$, $MN_{j+q-4}$, $MN_{j+q-3}$, $MP_{j+q-2}$, $MP_{j+q-1}$, in FIGS. 2 and 4) coupled as pumping transistors to respective ones of the capacitors in the string of capacitors,
- a compensation coupling (e.g. $C_C$) between the transistors in said string of transistors and either a subsequent or a preceding transistor in said string of pumping transistors.

For instance, in one or more embodiments, said compensation coupling may include coupling between the current sink terminal of a pumping transistor and the current generating terminal of a subsequent transistor in the string and/or coupling between the current sink terminal of a pumping transistor and the current sink terminal of a subsequent or preceding transistor in the string.

In one or more embodiments, said compensation coupling may include capacitive coupling.

In one or more embodiments, said compensation coupling may extend bridging an even number of transistors in said string of transistors, said number being e.g. two or four.

In one or more embodiments, the transistors in said string of transistors may be coupled via their current generating terminals to respective ones of the capacitors in said string of capacitors.

In one or more embodiments, said circuit input may include two input lines with the capacitors in said string of capacitors coupled in an alternate sequence to said input lines.

In one or more embodiments, said compensation coupling may include:
- a plurality of compensation capacitors,
- a string of diode-connected transistors, e.g. PMOS or NMOS transistors, or high resistivity resistors coupled to said plurality of compensation capacitors for selecting a compensation voltage resolution as provided by said compensation coupling.

In one or more embodiments, said compensation coupling may include:
- a first capacitor set between the current sink terminal and the control terminal of a transistor in said string of transistors, and/or
- a second capacitor between said control terminal of a transistor in said string of transistors and the current generating or sink terminal of another transistor in the string.

In one or more embodiments, electrically powered apparatus, optionally battery-less electrically powered apparatus (e.g. a mobile RF terminal or a wireless sensor) may include an energy harvester circuit 10 as exemplified herein.

Without prejudice to the underlying principles, the details and embodiments may vary, even significantly, with respect to what has been described by way of example only without departing from the extent of protection.

The extent of protection is defined by the annexed claims.

The invention claimed is:

1. An energy harvester circuit, comprising:
   a plurality of capacitors coupled to a differential circuit input configured to receive energy to be harvested, wherein the capacitors in said plurality of capacitors are coupled in an alternate sequence to said differential circuit input,
   a string of transistors coupled in series as pumping transistors to respective ones of the capacitors in said plurality of capacitors, and
   a compensation coupling circuit coupled to a first node of said each transistor in said string of transistors and a second node of said one of a subsequent or a preceding transistor to said each transistor in said string of transistors, said compensation coupling circuit comprising:
      a first compensation capacitor coupled between the first node and a control node of said each transistor;
      a second compensation capacitor coupled between the control node and the second node, and
      a string of diode-connected transistors coupled in series between the first and second nodes, and including a first diode-connected transistor coupled between the first node and the control node of said each transistor and a second diode-connected transistor coupled between the control node of said each transistor and the second node.

2. The energy harvester circuit of claim 1, wherein the first node is a current sink terminal of said each transistor and the second node is a current generating terminal of said one of the subsequent or the preceding transistor to said each transistor in said string of transistors.

3. The energy harvester circuit of claim 1, wherein the first node is a current sink terminal of said each transistor and the second node is a current sink terminal of said one of the subsequent or the preceding transistor to said each transistor in said string of transistors.

4. The energy harvester circuit of claim 1, wherein said compensation coupling circuit extends to bridge an even number of transistors in said string of transistors.

5. The energy harvester circuit of claim 4, wherein said even number comprises one of two or four.

6. The energy harvester circuit of claim 1, wherein one of current generating terminals or current sink terminals of the transistors in said string of transistors are coupled to respective ones of the capacitors in said string of capacitors.

7. The energy harvester circuit of claim 1, wherein said differential circuit input comprises two input lines, and wherein the capacitors in said string of capacitors are coupled in an alternate sequence to said two input lines.

8. The energy harvester circuit of claim 1, wherein said string of diode-connected transistors is configured to select a compensation voltage resolution as provided by said compensation coupling to the control node of said each transistor.

9. The energy harvester circuit of claim 8, wherein said compensation coupling circuit further includes a final stage including transistors sharing a string of diode-connected transistors.

10. An energy harvester circuit, comprising:
a plurality of capacitors coupled to a differential circuit input configured to receive energy to be harvested, wherein the capacitors in said plurality of capacitors are coupled in an alternate sequence to said differential circuit input,
a string of transistors coupled in series as pumping transistors to respective ones of the capacitors in said plurality of capacitors, and
a compensation coupling circuit coupled to a first node of said each transistor in said string of transistors and a second node of said one of a subsequent or a preceding transistor to said each transistor in said string of transistors, wherein said compensation coupling circuit includes:
a first compensation capacitor coupled between the first node and a control node of said each transistor;
a second compensation capacitor coupled between the control node and the second node, and
a string high resistivity resistors coupled in series between the first and second nodes, and including a first resistor coupled between the first node and the control node of said each transistor and a second resistor coupled between the control node of said each transistor and the second node.

11. The energy harvester circuit of claim 10, wherein said compensation coupling circuit includes a final stage including transistors sharing a string high resistivity resistors.

12. The energy harvester circuit of claim 1, wherein said differential circuit input receives energy to be harvested from a radio frequency signal.

13. The energy harvester circuit of claim 1, further comprising a battery-less electrically powered load coupled to an output of the energy harvester circuit.

14. An energy harvester circuit, comprising:
a first input;
a second input;
a first pumping transistor having a source-drain path coupled between a first node and a second node;
a first capacitor coupled between the second node and the first input;
a second pumping transistor having a source-drain path coupled between the second node and a third node;
a second capacitor coupled between the third node and the second input;
a first compensation capacitor coupled between the first node and a control terminal of the first pumping transistor;
a second compensation capacitor coupled between the control terminal of the first pumping transistor and the third node; and
a third compensation capacitor coupled between the second node and a control terminal of the second pumping transistor.

15. The energy harvesting circuit of claim 14, further comprising:
a first diode-connected transistor coupled between the first node and the control terminal of the first pumping transistor;
a second diode-connected transistor coupled between the control terminal of the first pumping transistor and the third node; and
a third diode-connected transistor coupled between the second node and the control terminal of the second pumping transistor.

16. The energy harvesting circuit of claim 15, wherein said second diode-connected transistor comprises a plurality of series connected second diode-connected transistors coupled between the control terminal of the first pumping transistor and the third node.

17. The energy harvesting circuit of claim 14, wherein the source-drain paths of the first and second pumping transistors are directly connected in series with each other.

18. The energy harvesting circuit of claim 14, wherein the source-drain paths of the first and second pumping transistors are indirectly connected in series with each other.

19. The energy harvesting circuit of claim 15, wherein the first diode-connected transistor comprises a plurality of series connected first diode-connected transistors coupled between the first node and the control terminal of the first pumping transistor.

20. The energy harvester circuit of claim 10, wherein the first node is a current sink terminal of said each transistor and the second node is a current generating terminal of said one of the subsequent or the preceding transistor to said each transistor in said string of transistors.

21. The energy harvester circuit of claim 10, wherein the first node is a current sink terminal of said each transistor and the second node is a current sink terminal of said one of the subsequent or the preceding transistor to said each transistor in said string of transistors.

22. The energy harvester circuit of claim 10, wherein said compensation coupling circuit extends to bridge an even number of transistors in said string of transistors.

23. The energy harvester circuit of claim 22, wherein said even number comprises one of two or four.

24. The energy harvester circuit of claim 10, wherein one of current generating terminals or current sink terminals of the transistors in said string of transistors are coupled to respective ones of the capacitors in said string of capacitors.

25. The energy harvester circuit of claim 10, wherein said differential circuit input comprises two input lines, and wherein the capacitors in said string of capacitors are coupled in an alternate sequence to said two input lines.

26. The energy harvester circuit of claim 10, wherein said string high resistivity resistors is configured to select a compensation voltage resolution as provided by said compensation coupling to the control node of said each transistor.

27. The energy harvester circuit of claim 26, wherein said compensation coupling circuit further includes a final stage including transistors sharing a string high resistivity resistors.

28. The energy harvester circuit of claim 10, wherein said differential circuit input receives energy to be harvested from a radio frequency signal.

29. The energy harvester circuit of claim 10, further comprising a battery-less electrically powered load coupled to an output of the energy harvester circuit.

30. An energy harvester circuit, comprising:
a first input;
a second input;
a first pumping transistor having a source-drain path coupled between a first node and a second node;
a first capacitor coupled between the second node and the first input;
a second pumping transistor having a source-drain path coupled between the second node and a third node;
a second capacitor coupled between the third node and the second input;
a first compensation capacitor coupled between the first node and a control terminal of the first pumping transistor;
a second compensation capacitor coupled between the control terminal of the first pumping transistor and the third node;
a first diode-connected transistor coupled between the first node and a control terminal of the first pumping transistor; and
a second diode-connected transistor coupled between the control terminal of the first pumping transistor and the third node.

31. The energy harvesting circuit of claim 30, further comprising:
a third compensation capacitor coupled between the second node and a control terminal of the second pumping transistor; and
a third diode-connected transistor coupled between the second node and the control terminal of the second pumping transistor.

32. The energy harvesting circuit of claim 30,
wherein said first diode-connected transistor comprises a plurality of series connected first diode-connected transistors; and
wherein said second diode-connected transistor comprises a plurality of series connected second diode-connected transistors.

33. The energy harvesting circuit of claim 30, wherein the source-drain paths of the first and second pumping transistors are directly connected in series with each other.

34. The energy harvesting circuit of claim 30, wherein the source-drain paths of the first and second pumping transistors are indirectly connected in series with each other.

* * * * *